Jan. 28, 1941.
O. LIEBMANN
2,229,855
COUPLED RANGE FINDER
Original Filed Feb. 18, 1939
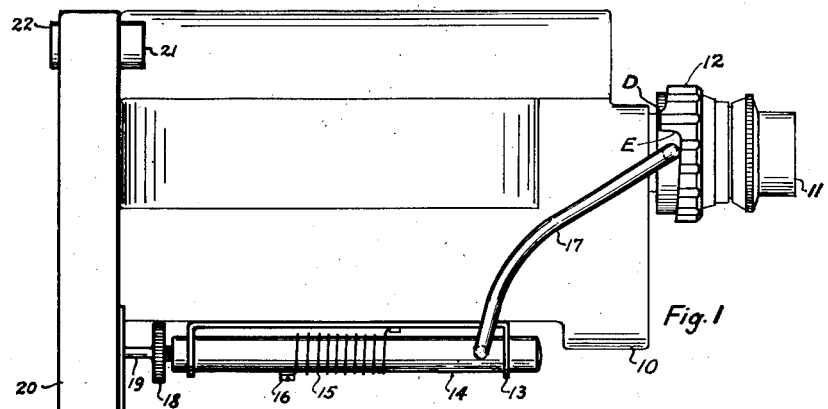
Fig. 1
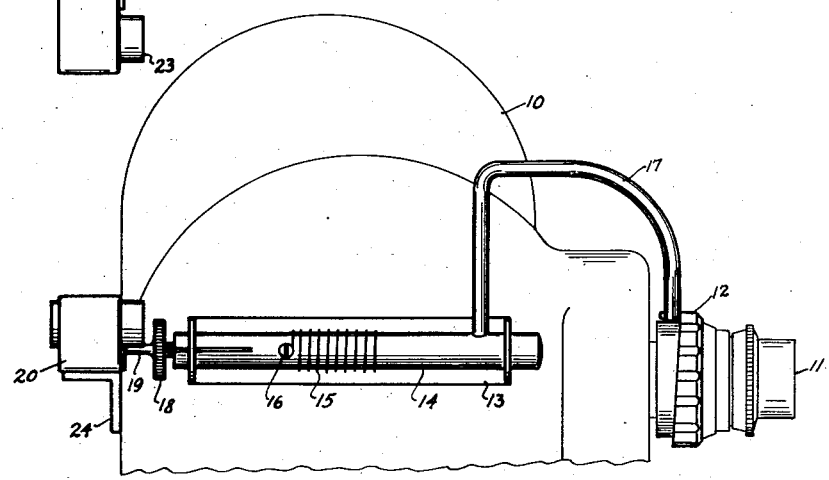
Fig. 2
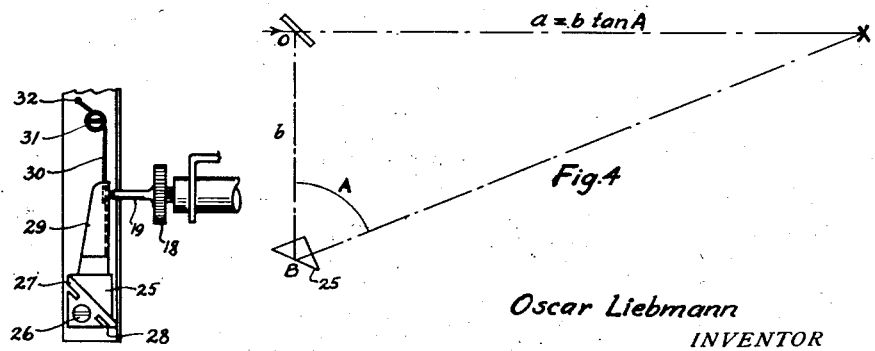
Fig. 3
Fig. 4
Oscar Liebmann
INVENTOR
BY Peter M. Boesen.
ATTORNEY Patented Jan. 28, 1941

2,229,855

UNITED STATES PATENT OFFICE 2,229,855

COUPLED RANGE FINDER

Oscar Liebmann, Bergenfield, N. J., assignor to Q. O. S. Corporation, New York, N. Y., a corporation of New York Original application February 18, 1939, Serial No. 257,038. Divided and this application January 9, 1940, Serial No. 313,261

1 Claim. (Cl. 95—44)

This is a division of my copending application, Serial No. 257,038, filed February 18, 1939, and relates to improvements in range finders of the type used with motion picture cameras and which are coupled mechanically to the focusing mechanism whereby correct focusing is obtainable at any distance, and in particular, the invention relates to the mechanical coupling means linking the range finder with the lens mechanism.

An important object of my invention is to provide a type of coupling which will give the utmost precision in the adjustments of the focus.

A further object of my invention is to provide a range finder which can be manufactured in quantities at low cost and mounted on cameras with various types of lenses with only minor adjustments, and without making special cams or other devices for each individual camera. Other objects and advantages of my invention will be apparent during the course of the following description.

In the accompanying drawing, forming a part of this specification, and in which like numerals are employed to designate like parts throughout the same—

Figure 1 is a plan view of a motion picture camera equipped with a preferred embodiment of my invention, Figure 2 is a side elevation of the same camera and range finder, Figure 3 is a detail plan view of the rotatable reflector mechanism of the range finder, and, Figure 4 is a schematic diagram of the range finder.

Referring to the drawing, the numeral 10 designates an ordinary amateur type, motion picture camera with lens 11. On the rotatable lens focusing mechanism is rigidly mounted the knurled sleeve 12 the rear face of which is partly milled away to form a special curve, similar to that of the thread of a screw, beginning at the point designated D and ending at E, see Figure 1. A bracket 13 is mounted rigidly on the side of the camera 10 and a rod 14 is slidable longitudinally in the holes formed in the ends of the bracket 13. A coil spring 15 is placed around the rod 14 and is fastened to 14 at one end by the screw 16, the other end being fastened to bracket 13. A rigid rod 17 is fastened securely to rod 14 and is extending in an arc over to the rotatable sleeve 12 where the end of rod 17 is pushed up against the curved face of sleeve 12 by the action of spring 15. The rear end of rod 14 carries a centrally located adjusting screw 18 from which a pin 19 extends into the range finder housing 20. This housing 20 is usually made up from a square tubing closed at both ends. It contains a range finder of the usual type with one semi-transparent reflector with lens 21 and eye piece 22 and one rotatable reflector with lens 23, see Figure 1. The range finder housing 20 is mounted transversely across the camera on a bracket 24 (Fig. 2) in a manner such that lenses 21 and 23 are afforded an unobstructed view forward.

In Figure 3 is shown in detail the interior mechanism of the range finder. The rotatable reflector 25 is pivoted at 26 and is mounted on the triangular block 27 which has milled slots 28 to prevent warping. The block 27 is fastened to a lever 29 which is held against pin 19 by spring 30. The spring 30 is twisted around screw 31 and the end is fastened in hole 32.

The operation of my invention is based upon the well known principle of the range finder as illustrated in Figure 4. The semi-transparent reflector is located at O and the rotatable reflector 25 is located at B, the distance $b$ between OB is fixed and if an object is located at X the distance $OX = a = b \tan A$, where A is the angle between OB and BX.

Referring now to Figures 1, 2 and 3, it is obvious upon inspection that when the knurled sleeve 12 is turned the end of the rod 17 will follow the curved cam surface from E to D, and in so doing the rod 17 will transfer its longitudinal motion to the rod 14 which will again transfer the motion through the pin 19 to the lever 29 and thereby giving the reflector 25 a slight rotational movement. While turning sleeve 12 the operator looks through window 22 until coincidence is obtained, and the coupling mechanism is precalibrated in such a way that when the range finder shows coincidence the lens is focused to the correct distance. It was previously through that it would be sufficient that the cam surface from D to E would described a straight line, but it was found that this resulted in very considerable inaccuracies on distances near the ends of the range. A curve may be found by calculation, but a more satisfactory way is to determine the same by exact experimental methods. It has been found that by so doing it is possible to make use of the same curve for lenses of various types merely by making slight adjustments of the screw 18.

It is to be understood that the form of my invention, herewith shown and described, is to be taken as a preferred example of same, and that various changes in the shape, size, and arrangement of parts may be resorted to, without departing from the spirit of my invention or the scope of the subjoined claim.

Having thus described my invention, I claim:

In a focusing range finder having coupling means of the character described, comprising a rectangular range finder housing having a fixed semi-transparent reflector mounted at one end and a rotatable reflector mounted at the other end, and said housing being arranged for mounting transversally on a camera; a lever fastened to said rotatable reflector; a cylindrical rod, spring loaded and slidably mounted parallel to the axis of the camera and on the outside of same; a double ended adjustable thumb screw adjustably fastened to the rear end of said cylindrical rod, one end of said thumb screw being in operable engagement with said lever and said rotatable mirror; a curved cam fastened to the rotatable part of the lense focusing mechanism of the camera, and a curved rod fastened with one end to said cylindrical rod and suitably bent so as to engage said rotatable curved cam to the lens focusing mechanism with its other end.

OSCAR LIEBMANN.